(12) United States Patent
Haimer

(10) Patent No.: US 9,707,647 B2
(45) Date of Patent: Jul. 18, 2017

(54) MIST COOLING

(75) Inventor: Franz Haimer, Hollenbach/Igenhausen (DE)

(73) Assignee: Franz Haimer Maschinenbau KG, Hollenbach (DE)

( * ) Notice: Subject to any disclaimer, the term of this patent is extended or adjusted under 35 U.S.C. 154(b) by 1370 days.

(21) Appl. No.: 13/386,882

(22) PCT Filed: Jul. 26, 2010

(86) PCT No.: PCT/EP2010/060807
§ 371 (c)(1),
(2), (4) Date: Apr. 9, 2012

(87) PCT Pub. No.: WO2011/009962
PCT Pub. Date: Jan. 27, 2011

(65) Prior Publication Data
US 2012/0186286 A1    Jul. 26, 2012

(30) Foreign Application Priority Data
Jul. 24, 2009 (DE) .................. 10 2009 034 730

(51) Int. Cl.
*B23P 11/02* (2006.01)

(52) U.S. Cl.
CPC .................................. *B23P 11/027* (2013.01)

(58) Field of Classification Search
CPC ....... B01L 7/02; B04C 3/02; B04C 2009/008; B05C 9/14; F24F 5/0035; B23P 11/027; F28C 3/06; F28C 3/08

USPC ...... 62/314, 121, 238.2, 408, 428; 165/80.1, 165/80.3–80.5
See application file for complete search history.

(56) References Cited

U.S. PATENT DOCUMENTS

| | | | |
|---|---|---|---|
| 5,106,285 A * | 4/1992 | Preston | 425/144 |
| 7,143,958 B1 * | 12/2006 | Dorney | 239/289 |
| 2001/0024020 A1 * | 9/2001 | Rabe | 279/158 |
| 2010/0062522 A1 * | 3/2010 | Fanning et al. | 435/303.1 |

FOREIGN PATENT DOCUMENTS

| | | |
|---|---|---|
| DE | 10102710 A1 | 9/2002 |
| DE | 10320641 A1 | 11/2004 |
| DE | 102005024766 A1 | 11/2006 |
| DE | 202006002270 U1 | 3/2007 |
| DE | 202007000869 U1 | 4/2007 |
| DE | 102007000906 A1 | 10/2007 |
| DE | 102007044097 A1 | 3/2009 |
| DE | 102008051282 A1 | 4/2010 |
| EP | 1138422 A2 | 10/2001 |

(Continued)

*Primary Examiner* — Elizabeth Martin
*Assistant Examiner* — Zachary R Anderegg

(57) ABSTRACT

The invention relates to a device for cooling an object that was previously subjected to a heat application, generally a multi-piece composite, particularly in the form of a shrink-fit chuck into which the shank of a tool was chucked or from which it was removed (cooling device), wherein the device comprises a pump, by way of which it generates a carrier gas flow, particularly an air flow, which is charged with a liquid cooling medium, particularly water, so that a coolant flow, the majority of the volume of which consists of the carrier gas, is created, which then spreads over at least the section of the object to be cooled.

18 Claims, 3 Drawing Sheets

(56) References Cited

FOREIGN PATENT DOCUMENTS

| | | | |
|---|---|---|---|
| EP | 1584408 | A1 | 10/2005 |
| FR | 2844734 | A1 | 3/2004 |
| JP | 2002079426 | A | 3/2002 |
| WO | 0189758 | A1 | 11/2001 |
| WO | 2007028522 | A2 | 3/2007 |
| WO | WO 2007028522 | A2 * | 3/2007 |

* cited by examiner ical equipment. Furthermore, the maxi-
MIST COOLING

FIELD OF THE INVENTION

The invention relates to a technology for cooling off again an item previously subjected to a heat application, most frequently a multi-part shrinking assembly, in particular in the form of a shrink chuck for centrically shrinking the shank of a rotary tool, for example a drill, milling cutter or reamer. Such a device will hereinafter be referred to by the key word "cooling device".

BACKGROUND OF THE INVENTION

An extensive prior art exists which deals with solving the problem of cooling off a tool holder that has previously been heated in order to shrink-release it from or shrink-fit it into a tool.

Roughly summarized, three different cooling principles have so far been proposed. These are air cooling, liquid cooling and cooling by solid-body contact, i.e. by intimately bringing into contact the surface of the tool holder to be cooled with a highly heat-conductive cooling body into which the heat dissipates.

The European patent application EP 1 138 422 A2 as well as, for example, the Japanese patent JP 2002079426 propose an air cooling process that is realized by the heated tool holder being exposed to the strong cooling air stream of a fan. A cooling air stream is capable of cooling the tool holder very uniformly and gently so that there is no danger that the tool holder, which is initially about 300° to 400° hot in places, is distorted by the cooling process. However, it is one drawback of any air cooling that the cooling process progresses comparatively slowly and therefore requires a considerable amount of time.

The French patent application FR 2 844 734 proposes a device for cooling the tool holder primarily by solid-body cooling—a cooling ring is put over the hot sleeve section of the tool holder, the inner surface of said ring intimately abutting against the sleeve section and withdrawing heat from it by thermal conduction, which is then released to the outside by the cooling ring via its cooling fins which are situated in the cooling air stream. Compared to conventional air cooling, the cooling ring thus increases the surface that the cooling air effectively sweeps over.

Such a cooling ring has to be put on and removed again, thus requiring an additional working step which costs time and thus negates the advantage of a faster cooling-off process than in the case of direct fanning of the tool holder. Even more serious is the problem that the sleeve sections of the various tool holders to be cooled have different diameters or contours and that therefore an entire set of different cooling rings has to be kept in store, because the cooling ring principle only works if the cooling ring is able to adapt intimately to the respective sleeve section. Thus, not only is an increased material, storage and supply expenditure required, rather, the fitting cooling ring also has to be selected in each case manually or by means of correspondingly extensive technical equipment. Furthermore, the maximum achievable cooling performance of such a system is naturally limited by the thermal conductivity of the cooling body. Consequently, the cooling performance is limited particularly if the cooling body is not used instationarily (i.e. is heated up from an initially cold state), but if it has to cool down various tool holders directly one after the other.

The German patent applications DE 103 20 641 A1 and DE 10 2007 000 906 A1 each propose liquid cooling in the form of a submersion bath into which the heated tool holder is lowered. In this way, the heated tool holder is in each case cooled off very rapidly. However, this time advantage is negated again to a large extent by the completely or extensively wetted tool holder having to be dried off again in a subsequent step (already in order to avoid corrosion) before it can be stored. Furthermore, such an abrupt cooling-off always entails the risk of the tool holder being distorted, and places considerable stress on the tool holder also if the tool holder is not distorted immediately.

Patent applications EP 1 584 408 A1 and WO 2007/028522 A2 propose liquid cooling by sprinkling or spraying the tool holder to be cooled off with a liquid coolant. In both cases, three perforated pipes are provided which are disposed distributed laterally next to and around the chuck to be cooled off, wherein a coolant jet is discharged directly onto the chuck from each of the holes. Naturally, this coolant jet has to be strong enough for sufficiently wetting the entire surface to be cooled by it (namely a third of the outer circumference to be cooled off).

Such a direct sprinkling or spraying is advantageous in that the tool holder to be cooled off is cooled off rapidly, but not too abruptly. However, there is still the problem also in this case that it is practically impossible to cool off the tool holder just as uniformly as, for example, by means of air cooling. For it is inevitable, even if the nozzles discharging the coolant are disposed uniformly about the tool holder, that certain sections of the tool holder are sprinkled or sprayed with the coolant to a greater extent than other sections.

In the case of such a cooling by means of direct sprinkling or spraying, there is still the danger of the tool holder being distorted, even if it is only by a small amount, which would not be a bother in components other than a tool holder, which is subject to the highest requirements with regard to its running properties. Moreover, there is still the problem that it is possible only to a rudimentary extent to vary the cooling performance—for example WO 2007/028522 A2 proposes to switch the coolant nozzles on and off in an interval-like manner in order to be able to influence the cooling rate at least slightly.

Furthermore, the tool holder is intensively wetted with the liquid coolant by direct spraying and therefore has to be dried first for a longer period of time subsequent to the cooling-off process.

Finally, such cooling exclusively by direct sprinkling or spraying of the coolant is disadvantageous in that, in the initial phase of the cooling-off process, when the tool holder is still very hot, a not inconsiderable part of the coolant evaporates and possibly escapes into the environment, or that it has to be collected using separate measures in order not to pollute the environment.

Finally, it should be noted that, generally, there is always the problem, in all those devices from the prior art that use liquid coolants, that special measures have to be taken to drain off or collect the coolant, which rather slowly runs down the tool holder after the tool holder has been pulled out of the submersion bath again or after the spraying has been switched off.

In view of this, the invention is based on the object of providing a cooling device which is capable of causing a significantly more rapid cooling than those cooling devices that are based on the air cooling principle, but in which, in contrast to the hitherto known cooling devices that use water cooling, there is no danger of too-rapid or non-uniform cooling. Preferably, the cooling device according to the invention is supposed to achieve the object especially also where shrink chucks are to be cooled off.

SUMMARY OF THE INVENTION

According to the invention, the device comprises a pump with which it generates a carrier gas flow. This is charged with a liquid cooling agent, so that a coolant flow is generated which, volume-wise, predominantly consists of the carrier gas and whose cooling action is mainly determined by the liquid cooling agent transported by the carrier gas flow.

Thus, the invention is based on the idea of using the cooling agent not largely undiluted, as is the case in the submersion or flush cooling systems, but to dissolve it into comparatively fine droplets, to thus more or less dilute them, and to then transport these droplets by means of a carrier gas. There is thus the possibility of guiding the droplets past the item to be cooled at an increased speed—in such a way that the result is a rapid, but not too abrupt, cooling, which moreover is particularly uniform.

In this case, the transport by means of the carrier gas (which ideally circulates in a closed loop) has the advantage that, preferably, considerably finer droplets can be used than in the known sprinkling or spraying, which—if a dissolution into individual drops takes place at all—depends on a comparatively large drop size because only in this way, the individual drops can be accelerated to a sufficient extent in order to be able to overcome the distance to the item to be cooled.

According to the invention, it is most frequently the finely dispersed liquid cooling agent that absorbs the predominant part of the thermal energy to be dissipated.

In this case, it is one advantage of the procedure according to the invention that the droplets can be selected in such a way that no non-uniform cooling effect results even if the droplets evaporate spontaneously upon impact on the surface of the item to be cooled—in contrast to submersion or flush cooling, in which the evaporating cooling agent forms greater and smaller local vapor bubbles that temporarily impede heat transition and thus give rise to a risk of irregularities. Moreover, the vapor produced is immediately entrained and conducted away by the carrier gas flow in the procedure according to the invention. This is also important if water with corrosion inhibitors is used, because the latter form potentially harmful vapors.

Ideally, the atomization or nebulization of the cooling agent is so fine that its droplets are not only transported into the cooling chamber by the carrier gas flow, but substantially also out of it again. In this manner, the item to be cooled is not excessively wetted but is steadily brought into contact with new, fresh droplets. The droplets are at least predominantly so fine that their movement is not substantially determined by the force of gravity of the forces that the surface of the item to be cooled exerts on them, but mainly by the forces that the carrier gas flow exerts on them.

The cooling intensity can thus be influenced rather well by short-term variation of the speed of the carrier gas flow and/or of the amount of the liquid cooling agent added to the carrier gas flow.

At the same time, the fact that the coolant flow flows at an increased speed and consists, volume-wise, predominantly of the carrier gas and not of the liquid cooling agent permits shaping the coolant flow without any particular effort, for example, focusing it onto the item to be cooled and/or impart a swirl to it.

This also distinguishes the cooling device according to the invention from the prior art.

A general, universally valid figure for the size of the cooling agent droplets is difficult to specify because their ideal size is strongly dependent on the specific conditions.

As a rough reference point, it can be said that the cooling agent droplets in most cases should have a diameter that is at least less than 1 mm, or, clearly better, at least predominantly less than 0.5 mm. Ideally, the cooling agent droplets are at least predominantly smaller than 0.1 mm or so finely atomized that they form a real mist together with the carrier gas. Preferably, the cooling agent droplets obtain the aforementioned diameters already during their atomization or nebulization. In principle, however, it is sufficient if cooling agent droplets that have the aforementioned diameters are produced only during the further whirling (but substantially prior to the impact on the item to be cooled).

Preferably, the carrier gas flow is conducted in a substantially closed circuit. Consequently, neither the environment nor the workshop premises in which the cooling apparatus is operated are polluted by the carrier gas flow and/or the coolant. The latter is significant also if air is used as a carrier gas flow and water as a cooling agent, because neither is an unwanted movement of air produced, nor is water vapor being released to an excessive degree in the building.

Ideally, the coolant flow flows through the cooling chamber in a cross flow, i.e. either from the left to the right or from the bottom to the top. Such a cross flow ensures a complete and very uniform flushing of the cooling chamber and prevents the temporary formation of "heat pockets".

Optimally, the cross flow is at the same time conducted as a down flow, i.e. when the flow goes through the cooling chamber in the vertical direction from the top towards the bottom. Because such a down flow best prevents gravity from having an adverse effect upon the dispersion of the droplets consisting of cooling agent in the carrier gas flow which together form the coolant.

Within the context of a preferred exemplary embodiment, it is provided that the cooling device has a cooler downstream from the item to be cooled. Such a cooler not only reduces the temperature of the coolant flow and thus ensures a more efficient cooling during its next cycle. Rather, the cooler as a rule also contributes to the separation of the cooling agent, in particular the water used for this purpose, from the carrier gas flow. In this way, a relatively "dry" carrier gas flow is available on the pressure side of the fan. This opens up the opportunity to add a specific amount of cooling agent to the carrier gas flow during each cycle and thus specifically influence the cooling-off process.

Preferably, the cooling device comprises a pump in the form of a centrifugal fan and a cooler which is either entirely or partially accommodated in the center of the rotor of the centrifugal fan, or in the axial direction forward of the center of the rotor of the centrifugal fan. Such an accommodation of the cooler not only saves space, it moreover facilitates the separation of the cooling agent from the carrier gas flow. Because the cooling agent that has been separated by the action of the cooler and/or the centrifugal force that the rotor of the centrifugal fan exerts on the carrier gas flow can be collected very easily using an appropriately designed jacket of the centrifugal fan and can then be removed by means of a pump.

Preferably, the cooling device comprises an injector which is disposed upstream of the cooling chamber and which there charges the carrier gas flow with the liquid cooling agent. Introducing the cooling agent into the carrier gas flow in a sufficient distance upstream of the cooling chamber is advantageous in that the carrier gas flow and the cooling agent have sufficient opportunity to intermix intimately prior to reaching the cooling chamber. In this way, a particularly uniform cooling is provided—which is significant particularly at the beginning of a cooling cycle on an item that has been "freshly" introduced into the cooling chamber, as long as the item to be cooled or the shrink chuck to be cooled is still very hot and therefore reacts sensitively to non-uniform cooling.

In view of the statements regarding the down flow already made above, it is readily clear that charging the carrier gas flow with the cooling agent is optimal in that area in which the carrier gas flow is substantially already conducted as a down flow.

Ideally, a first guiding device is disposed between the injector and the cooling chamber. This is configured in such a way that it whirls the coolant flow before the coolant flow reaches the cooling chamber. This helps in dispersing the cooling agent optimally and as uniformly as possible.

Preferably, the first guiding device imparts a swirl to the coolant flow. If the coolant flow impacts the item to be cooled while swirling, there is less of a danger of a non-uniform cooling effect, for example because the item to be cooled has some kind of projections which on their lee-side cause a shading effect and thus cause a non-uniform cooling. This particularly applies to the cooling of shrink chucks which, when their axis of rotation is (ideally) oriented parallel to the main flow direction of the coolant, always have grooves or collar sections that extend transversely to the main flow direction and thus constitute an obstacle for the coolant flow that shades the lee area disposed behind them in the flow direction.

Ideally, the cooling device comprises a second guiding device. This second guiding device is preferably configured as a concentrator or nozzle that shapes the coolant flow and, in particular, focuses it on the item to be cooled or directs it specifically onto the item to be cooled. An optimum flow onto the item to be cooled can thus be effected. Optionally, it thus becomes possible to keep the required coolant flow slightly smaller because the desired result can be obtained already with a smaller coolant flow.

Preferably, this second guiding device is adjustable. It is either configured in such a way that its entire flow cross section is adjustable for this purpose; at least, however, it is configured in such a way that its outlet cross section is adjustable. It thus becomes possible to adapt the coolant flow individually to the dimensions of every item to be cooled, so that small shrink chucks, for example, can be cooled just as effectively as large shrink chucks.

In the context of an optimum configuration of the cooling device, it is provided that the cooling device has a third guiding device which preferably is also configured to be adjustable. If the items to be cooled are shrink chucks, this third guiding device is expediently disposed in the area of the free end of the sleeve section of the shrink chunk which is to be cooled. In the predominant number of cases, it is thus disposed (seen in the flow direction) either substantially at the same level with the free end of the sleeve section to be cooled or slightly behind it, or about 1 cm to 5 cm forward of the free end of the sleeve section to be cooled.

In order to be able to keep this position also in the case of shrink chucks that have different lengths along their axis of rotation, the third guiding device is preferably adjustable in and contrary to the main flow direction.

In this case, it is ideal if the third guiding device can also be adjusted in a direction normal to the main flow direction. In this way, the third guiding device can be moved into the coolant flow more or less far, so that it influences the flow cross section that remains free in its area, thus influencing the back pressure and optionally also the locally occurring flow speed.

Finally, it makes sense in many cases to configure the third guiding device in such a way that its angle of incidence can be changed and the third guiding device thus imparts a stronger or weaker swirl to the coolant flow.

Further advantages, optional embodiments and effects become apparent from the following description of two exemplary embodiments of the invention.

DETAILED DESCRIPTION OF THE PREFERRED EMBODIMENTS

Figure 1:
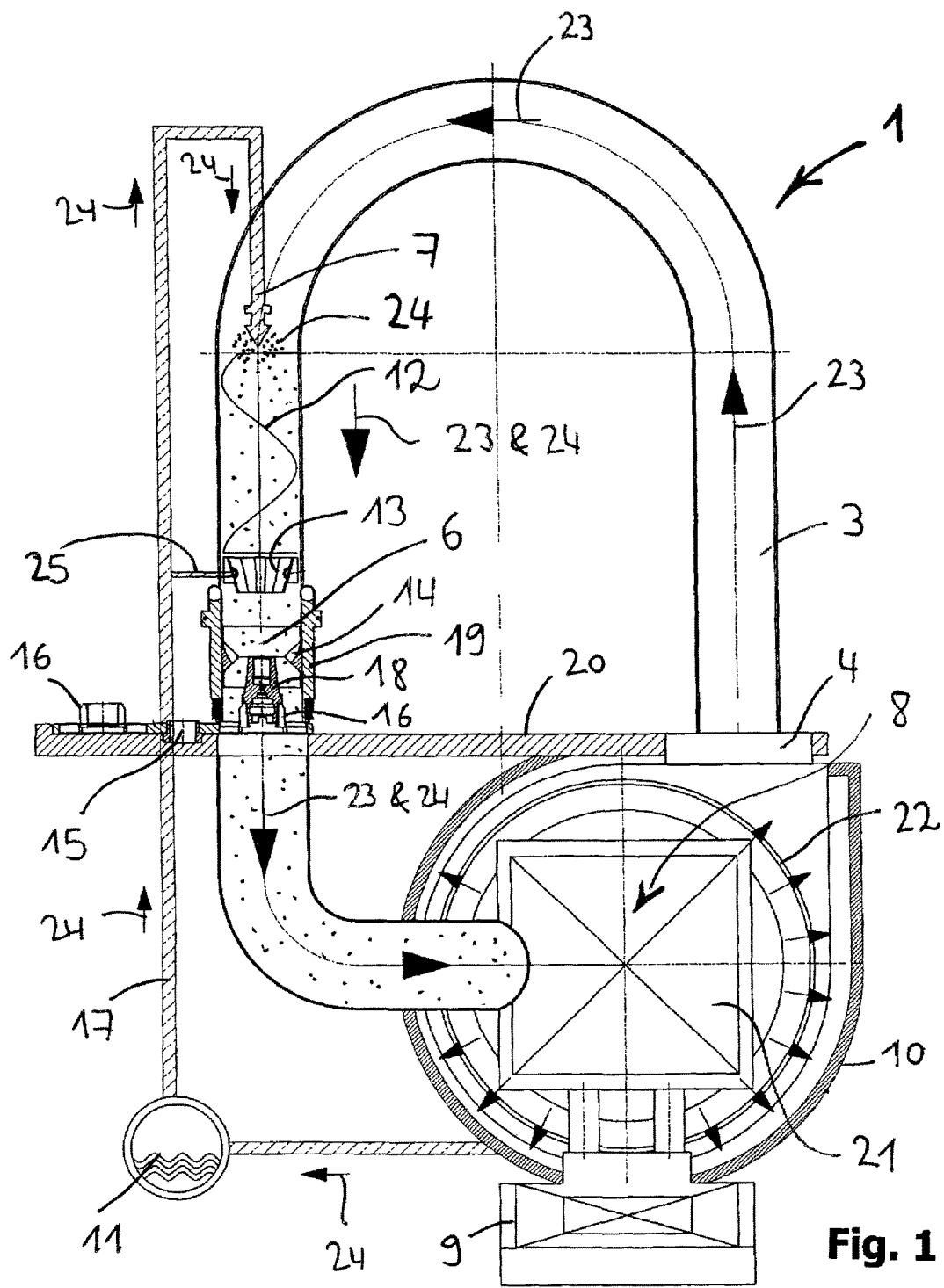
FIG. 1 shows a partially sectional side view of a cooling apparatus according to the invention (first embodiment), which is configured as a separate station subsequent to a shrinking device which is not shown.

The cooling apparatus according to the invention, which is illustrated by the exemplary embodiment described below, is constructionally especially designed for use as a cooling apparatus for tool holders employing shrinking technology, and displays its superior strengths especially in this special technological field, in which there has already been a multitude of attempts to accomplish cooling that is as gentle as possible but nevertheless quick. Given an appropriate design, it may moreover also be used in other ways wherever a very uniform, well-controllable and rapid cooling of items, or items joined by shrinking, and in particular tools has to be realized.

The cooling apparatus according to the invention may either be a separate device serving only for cooling, which is assigned to a shrinking device or installed "downstream" thereof. Such a device is described in the context of the following exemplary embodiment. Instead, however, it may also be a combined device into which a shrinking device has already been integrated, so that heating, shrinking in and out and cooling is possible with one and the same device.

Shrinking devices as such are known. Using them, the shanks of tools especially intended for high-speed rotation are shrunk in and out of the sleeve section of a correspondingly designed tool holder. In order to shrink in, the sleeve section is heated (preferably by means of an induction coil enclosing it) so that the tool shank can be inserted into the accommodating opening of the sleeve section that is enlarged thereby. The outer diameter of the tool shank is slightly bigger than the nominal diameter of the accommodating opening, so that the tool is held in a press fit, non-rotatably, and with excellent centricity in the tool holder after the sleeve section has cooled down.

A prime example of such a shrinking device is described in the German patent application DE 101 02 710 A1 as well as in the international patent application WO 2001 089 758 A1, the entire content of which is included in the subject matter of this patent application. If the cooling apparatus is part of a combined device, the part constituting the shrinking device will preferably be designed, wholly or partially, as described in these patent applications. Of course, the cooling system according to the invention also works in conjunction with prior heating by hot air, flame, contact heating and the like.

Having said that, the specific description of the exemplary embodiment illustrated by the Figure may now be addressed.

The pump 2, which in this case is designed as a radial fan, is an important part of the cooling apparatus 1. The use of a radial fan is particularly expedient because the cooling agent condensed inside the fan can be very easily removed from a radial fan. However, the use of a different fan or of a pump working according to a totally different principle is also conceivable in principle.

The radial fan generates a strong airflow which in the case of the exemplary embodiment described serves as a carrier gas flow 23. The pumping capacity of the fan is relatively high, preferably adjustable or controllable, and is mostly between 5 m$^3$/min and 100 m$^3$/min, better 10 m$^3$/min and 100 m$^3$/min. The mean flow speed of the carrier gas flow in the vicinity behind the pump is preferably between 6 m/s and 36 m/s.

The carrier gas flow 23 is conducted in a substantially self-contained circuit, wherein small losses due to leakage may be harmless in individual cases, especially if air is used as a carrier gas flow. For this purpose, the pressure side 4 of the fan is connected via a carrier gas channel 3 to the suction side 5 of the fan. In the present exemplary embodiment, the carrier gas channel 3 is formed by a round pipe which preferably has an internal diameter of between 20 cm and 50 cm. However, the use of a round pipe is not an absolute requirement; theoretically, a flat duct or a duct with a polygonal cross section may also be used.

In the present exemplary embodiment, the carrier gas channel 3 is designed such that the carrier gas flow on the pressure side of the pump is first conducted in a vertical upward direction, is then deflected by 180° via a pipe bend, in order to now be conducted vertically downwards as a down flow.

An injector 7 is provided preferably in the upper part of the down-flow area, which charges the carrier gas flow 23 with a liquid cooling agent so that the carrier gas flow 23 and the cooling agent 24 added to it together form the coolant flow 23, 24.

In the present case, water serves as a cooling agent, because water is inexpensive, easy to handle and as such physiologically harmless. Of course, corrosion inhibitors or other additives may be added to the water, for example such additives that influence the wetting of the item to be cooled off, or the drop formation. Of course, this also applies if liquid cooling agents other than water are used.

The injector 7 is configured in such a way that it finely atomizes or nebulizes the cooling agent 24 with which it charges the carrier gas flow 23.

In the case of the exemplary embodiment described herein, the injector 7 consists of an atomizer with preferably several atomizer nozzles that atomize the liquid cooling agent 24 so finely that it charges the carrier gas flow 23 in the form of droplets that substantially have a mean diameter which is less than or equal to 0.05 mm. Preferably, the injector is fed by a dosing pump in the broadest sense, so that the cooling agent amount with which it currently charges the carrier gas flow can be specifically influenced.

In general, it should be noted that the injector may make use of various different principles in order to achieve a sufficient nebulization or a sufficiently fine injection of the cooling agent. A pump atomization similar to what is known from injection pumps is ideal. This is primarily due to the fact that such a pump atomization can be varied to a broader extent and thus offers a variety of options for influencing the coolant flow.

A sufficiently powerful piezo-electronic or ultrasound-induced nebulization, which is similar in principle to that known from indoor fountains used for room air humidification, can also be used very well instead.

Finally, it would also be alternatively conceivable under certain circumstances to use the Venturi principle for the purpose of atomization.

It goes without saying that the term injector does not mean that cooling agent 24 can be introduced into the carrier gas flow 23 only in a single location, or that a single device has to be used for atomization or nebulization.

In order to achieve an optimum dispersion of the liquid cooling agent, the injector 7 is preferably disposed at a distance of more than 25 cm, better more than 40 cm, upstream of the cooling chamber 6.

A substantially non-leaking sealable cooling chamber 6, into which the component to be cooled is inserted and in which it is retained, is preferably provided in the carrier gas channel 3 in the lower part of the down flow area. The actual operating area, into which an interruption is incorporated into the carrier gas channel 3 which permits a feeding device to insert or pivot an item to be cooled or the shrink chuck to be cooled into the carrier gas channel 3 and retain it there, is here referred to as the cooling chamber 6.

In the present case, the feeding device 15 is configured as a rotary table equipped with several appropriately designed tool-receiving sockets 16 to which the shrink chucks 18 to be cooled can be retainingly attached. The shrink chucks 18 to be cooled are placed on the rotary table one after the other. The rotary table transports them one after the other through the cooling device by respectively turning further by the corresponding angle.

Said interruption can be sealed in the above-described exemplary embodiment by a sliding sleeve 19 provided with corresponding gaskets being pushed manually or electromotively from its upper open position into its lower position, which represents the closed position. In its closed position, the sliding sleeve 19 provides a seal against the correspondingly shaped edges of the rotary table which in this case forms the feeding device 15. In turn, the rotary table with its underside provides a seal against the tabletop 20, either using a suitable contact seal or also using a gap-type seal of an appropriately small size.

The cooling chamber 6 is followed by another section of the carrier gas channel 3, which finally opens into an air hood 21. Seen in the axial direction, the latter is disposed forward of the rotor 22 of the centrifugal fan, which in this case forms the pump 2. Provided it does not protrude inside the rotor 22, this air hood is configured as a kind of box in which a cooler 8 is disposed. The cooler 8 is fed by a cooling unit 9 which supplies it with refrigerant. The heated coolant flow 23, 24 is cooled back down, and cooling agent 24 that has possibly evaporated during contact with the item to be cooled is re-condensed, by the cooler 8.

In the present case, the rotor 22 of the centrifugal fan can be configured in such a way that it generates centrifugal forces that separate at least a fraction of the droplets that the carrier gas flow 23 returning from the cooling chamber 6 still carries with it, as well as shavings and the like. Of course, it is optionally also possible to add cooling agent 24 only once and then leave it in the carrier gas flow 23 at least until the cooling-off process has ended completely.

Condensed or otherwise deposited droplets collect in the jacket 10 of the pump 2 configured as a fan, and are removed therefrom by means of the pump 11 for the cooling agent in order to return the cooling agent 24 to the injector 7 again.

Instead of or in addition to the correspondingly configured rotor 22 of the centrifugal fan, a centrifugal separator, for example in the form of a cyclone separator (not shown), may also be provided, which causes the droplets to be separated from the carrier gas flow again. Such a centrifugal separator may also be used at the same time to separate shavings and particles that were at first entrained.

Now, the various guiding devices that are provided within the carrier gas channel 3 still require closer explanation.

Downstream of the injector 7, even before it reaches the cooling chamber 6, the coolant flow passes the first guiding device 12. For example, this first guiding device 12 may be configured as a more or less pronounced swirl vane which protrudes from the walls of the carrier gas channel 3 into the coolant flow and imparts a swirl to the coolant flow 23, 24, i.e. whirls the coolant flow in an approximately screw-like manner. In this manner, the carrier gas flow 23 and the cooling agent 24 charging it intermix very intensively so that the result is a very uniform coolant flow 23, 24.

A second guiding device 13 is provided preferably downstream of the first guiding device. As will be understood from the Figure, this second guiding device here consists of a row of plates that are combined in an iris-like manner and whose bases are respectively pivotably hinged on the upstream side. It may therefore be referred to as an iris.

These plates form a type of nozzle that includes an approximately frusto-conical flow cross section. If the metal plates are pivoted radially inwards, then the flow cross section that is still available between them becomes ever smaller. The same also applies, of course, for the outlet cross section of the nozzle. It is clear that such a guiding device 13 in the form of a nozzle is well-suited for shaping a coolant flow 23, 24 in such a way that it flows around the item to be cooled or the chuck to be cooled optimally, taking into account its individual contour and size.

As can be seen from the Figure, the second guiding device, regardless of whether or not it is adjustable, can be connected, through a corresponding line 25, to the cooling agent 24 supply. In that case, it is equipped in such a way that it charges the coolant flow (23, 24) continuously or, if required, additionally, with (optionally additional) cooling agent.

Of course, it is possible to actuate this second guiding device 13 not only manually, but also electromotively. This makes sense in particular if the cooling device 1 knows the dimensions of the respective item to be cooled because they are already numerically available, supplied from somewhere else, or because the cooling apparatus is equipped with a corresponding detection system. In that case, the second guiding device 13 can be automatically set in such a way that it is configured optimally for the respective item to be cooled.

As can be seen, the coolant flow 23, 24 enters the cooling chamber 6 through the second guiding device 13.

There, the coolant flow meets the third guiding device 14. As can be seen, the guiding device in this exemplary embodiment is mounted or set exactly in such a way that it lies in the area of the free end of the sleeve section of the shrink chuck to be cooled in this case. This guiding device 14 forces the entire coolant flow into an area close to the wall of the shrink chuck 8 to be cooled. As can be seen, the third guiding device 14 here extends over an area lying about 7.5 cm above and below the free end of the sleeve section of the shrink chuck. In the present case, this third guiding device forms a bottleneck, in front of which the coolant flow backs up, so that a back pressure is generated there, and behind which the coolant flow impact relaxes. Given a correspondingly careful design of the flow conditions, this relaxation of the coolant flow is, in individual cases, so strong that the coolant flow has the tendency to absorb a noticeable additional amount of heat due to the relaxation. Of course, this improves the cooling capacity of the coolant flow. The third guiding device 14 is not limited to forming a kind of screen. Rather, correspondingly configured inclined surfaces are also formed, which impart a swirl to the coolant flow so that it runs around the shrink chuck to be cooled here in a movement whirling in a screw-like manner.

One or more of the above-described guiding devices may optionally be designed so as to generate whirls or a sufficiently steep local pressure drop, which lead to at least a noticeable part of the cooling agent droplets forming the carrier gas flow being "torn apart", or to them separating into even finer droplets due to other effects and being distributed even more uniformly in the carrier gas flow, so that a coolant flow of increased homogeneity is produced.

The cooling device according to the invention as a rule comprises a control or regulating system (hereinafter generally referred to as "control system") which expediently communicates with a temperature sensor that measures the current surface temperature of the item to be cooled off.

Most frequently, this control system is designed to be able to reproduce different cooling-off profiles on the cooling device. In this case, the use of a temperature sensor is useful but not an absolute requirement, because the control system can also function independently of the current status, if necessary, for example by a time profile being processed that is preselected based on the otherwise known geometry and which, based on empirical values, reproduces a cooling-off profile which as a rule consists of several phases.

There is a possibility to carry out an only moderate cooling-off process in a first optional phase in which the item to be cooled off—for example in the form of a shrink chuck—is still very hot. For this purpose, the carrier gas flow is first charged with only a smaller amount of cooling agent, and/or the carrier gas flow is conducted only at a reduced flow speed.

Once the temperature reaches or drops below a first temperature limit that marks the sub-critical range, another phase may follow in which the cooling rate is higher, by the added amount of the liquid cooling agent and/or the flow speed being increased.

This can be followed by a third phase: As soon as, or even already in due time before a temperature limit is reached that marks the temperature range defined as "cooled off", the coolant pump is switched off so that the item to be cooled off is now completely or substantially blown dry by the carrier gas flow, which is now no longer charged with fresh cooling agent. In order to save time, one may be satisfied in this case to expose the item to be cooled off to the more or less pure carrier gas flow only for a short period of time (but preferably forcedly) in such a way that the coolant adhering to it is entrained to at least such an extent that the surface of the now-cold item is at least no longer coated by a closed liquid film.

The above-mentioned three phases constitute basic building blocks from which the individual cooling-off profiles can be composed.

Of course, it is possible not to fix the respective cooling-off profiles specifically, but rather in a parameterized manner depending on the geometry of the item to be cooled off.

A great advantage of the manner of cooling according to the invention, especially in the case of cooling off shrink chucks again, lies in the fact that only a comparatively small total amount of cooling water has to circulate in order to cool sufficiently. This small amount of most frequently only 5 l to 10 l, especially when cooling shrink chucks, is sterilized regularly by the heat absorbed by the shrink chuck due to the fact that it is used consistently in the form of droplets, and is less susceptible to fungal and bacterial contamination, also due to the large pressure fluctuations during atomization and in the carrier channel.

Figure 2:
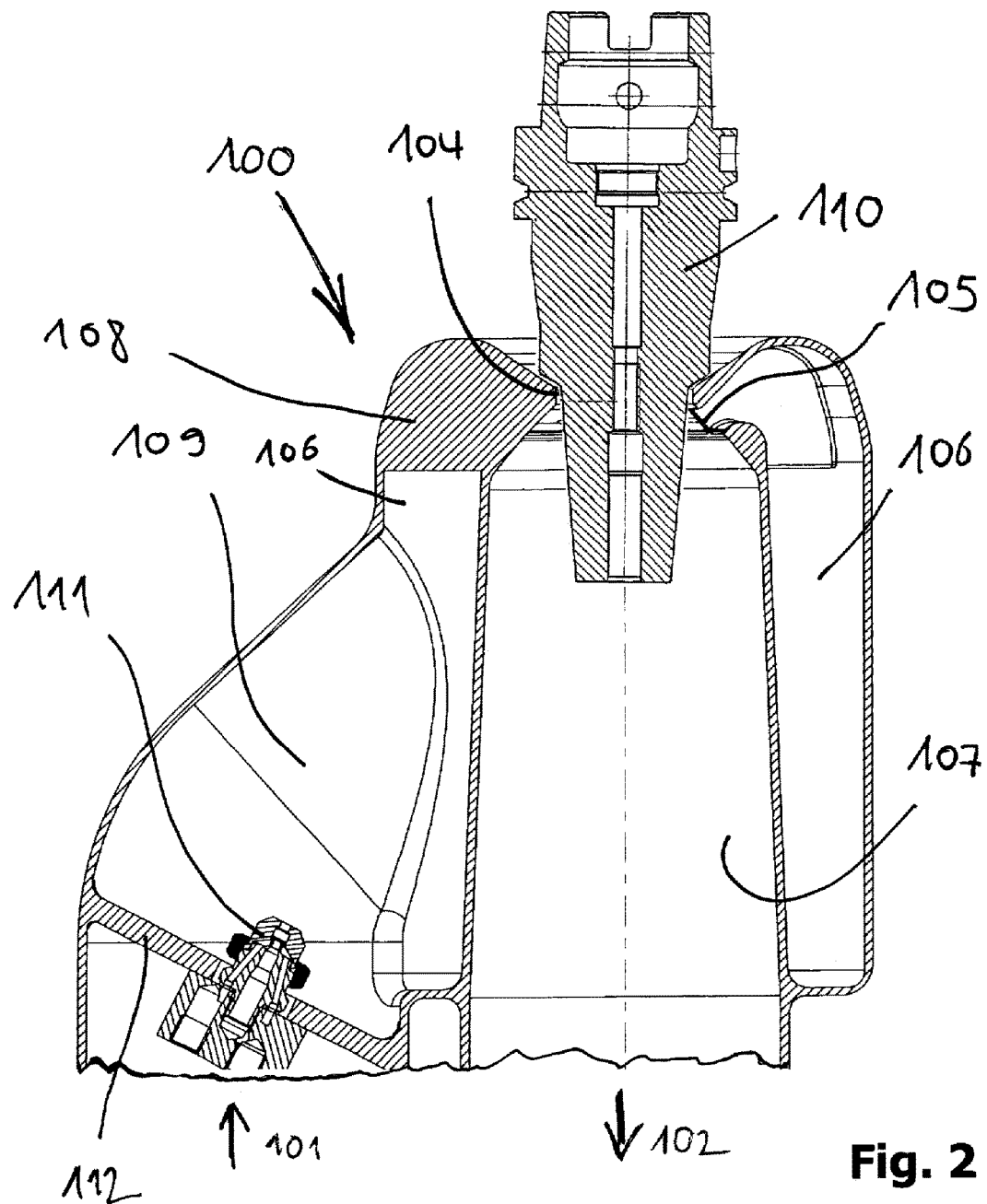
FIG. 2 shows a second embodiment loaded with a shrink chuck in a sectional side view.
Figure 3:
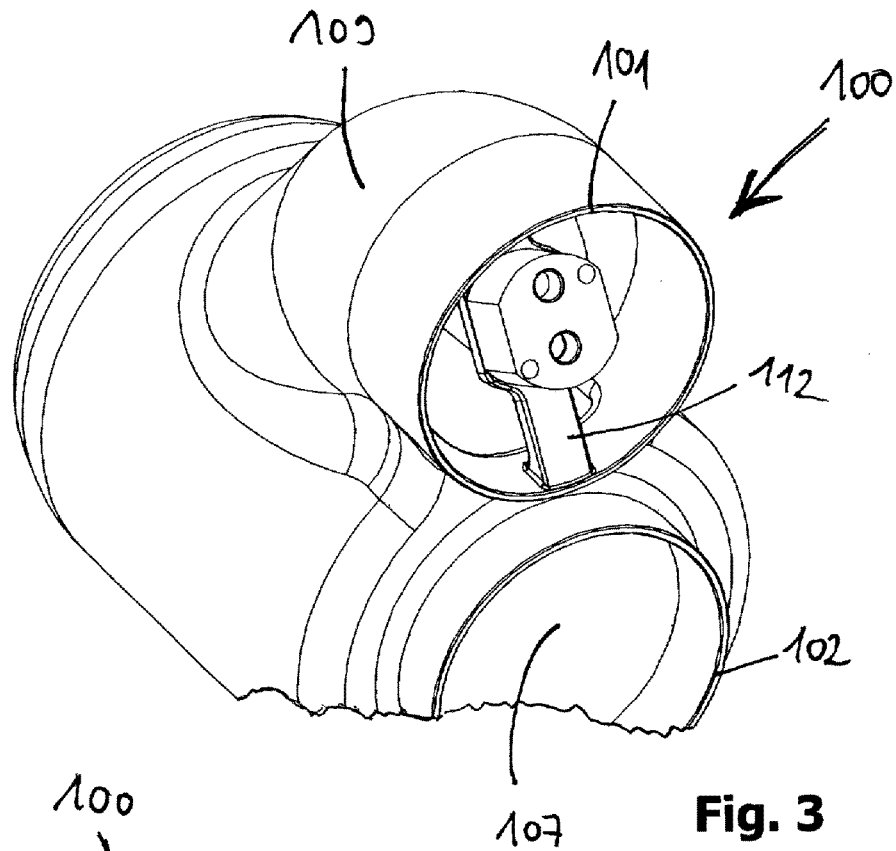
FIG. 3 shows the embodiment according to FIG. 2 viewed obliquely from below.
Figure 4:
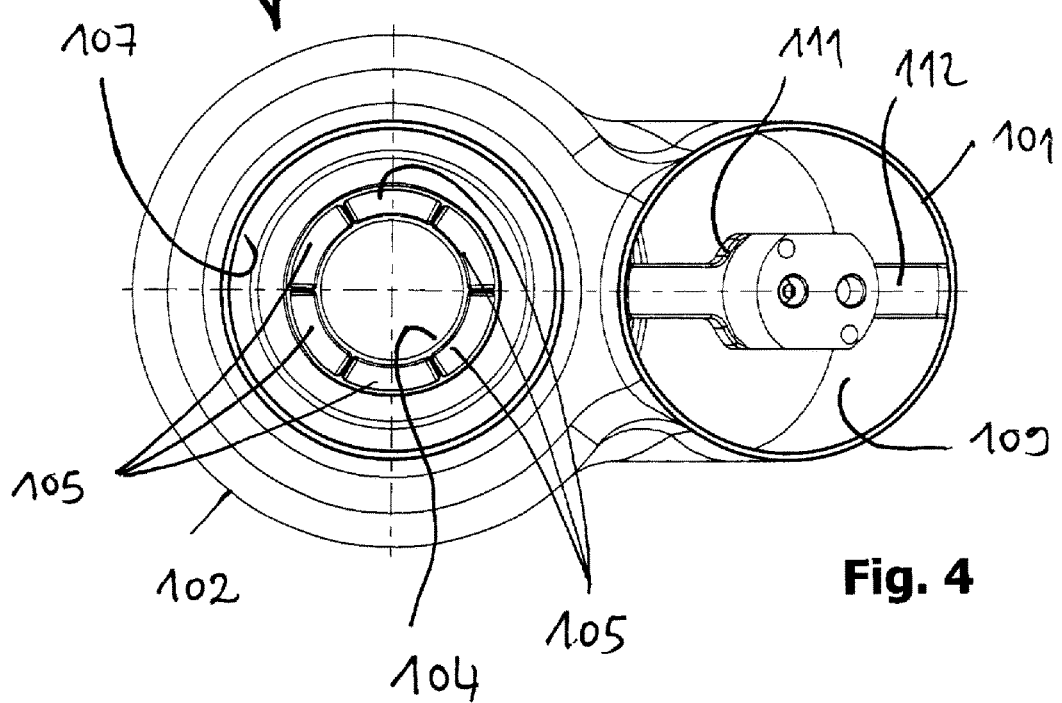
FIG. 4 shows the embodiment according to FIG. 2 viewed from below.

FIGS. 2 to 4 show a second exemplary embodiment of the invention.

This exemplary embodiment differs from the above-described exemplary embodiment by the fact that, in this exemplary embodiment, not the entire workpiece to be cooled is introduced into the carrier gas channel so that the carrier gas channel or cooling mist flows around it in its entirety, even in places where cooling is actually not required. Instead, in this embodiment, only that part of the workpiece to be cooled (also in this case preferably in the form of a tool chuck or shrink chuck) is introduced into the carrier gas channel that actually has to be cooled—in the case of a shrink chuck, this is the sleeve section enclosing the shank of the workpiece to be clamped.

The statements in connection with the descriptions of the first exemplary embodiment equally apply to the second exemplary embodiment unless otherwise required by the fact that the workpiece is not introduced completely into the carrier gas channel. In particular, all means for feeding and withdrawing, as well as for setting in motion and drying the carrier gas flow are the same as in the first exemplary embodiment. Only the piping of the lock part 100 shown by FIG. 1 has to be adapted in a customary manner and connected to the inlet neck 101 and the outlet neck 102 in order to be able to operate the embodiment shown by FIGS. 2 to 4 on the device for generating the carrier gas flow shown by FIG. 1.

What is important is that the statements regarding the issue of the flow speeds, the pressure or overpressure, the issue of the droplet size and of the coolant, the amount of coolant and the injector that were made in connection with the first exemplary embodiment apply also to the second exemplary embodiment. This also applies to the control system of the cooling device and the cooling-off profiles to be "run" by it.

It can best be seen in FIG. 2 that the lock part 100 inserted into the carrier gas channel and forming a part of the carrier gas channel has an insertion opening 104 configured in such a way that the part which is to be cooled of the workpiece to be cooled as intended with the cooling device (in this case the sleeve section of the shrink chuck 110) can be pushed through the opening into the carrier gas channel, while a part of the workpiece that is not to be cooled directly at least substantially seals the insertion opening when the workpiece is inserted to the maximum extent. Even if the insertion opening is not sealed completely, only a small exchange of the carrier gas with the ambient air takes place because the carrier gas flow is conducted in a closed circuit. Preferably, an elastomer gasket, which is not shown herein in detail, is provided, against which the workpiece to be cooled can rest in order to seal the insertion opening 104. Instead, the rim surrounding the insertion opening on the outside can also be configured in such a way that it corresponds to the contour of the workpiece section that rests against this rim as intended and thus forms a gap-type seal together with it. In the exemplary embodiment, this rim is configured to be conical and rests tightly against the corresponding cone shoulder of the shrink chuck.

As can be seen, a carrier gas outlet 105, which grasps the section to be cooled in the manner of a full or at least ¾ ring, and from which a carrier gas flow exits that sweeps over the workpiece's part to be cooled, is provided on the side of the insertion opening that faces the inside of the carrier gas channel, following the insertion opening immediately (or possibly, but less advantageously, at a distance of less than 2 cm). The carrier gas outlet is oriented in such a way that the flow is incident upon the workpiece's part to be cooled at an angle of <60 degrees, better <45 degrees to the longitudinal axis of the workpiece. Due to the carrier gas outlet grasping the workpiece's part to be cooled in a ring-shaped manner, it ensures that the carrier gas sweeps over the section to be cooled in a uniform way. The carrier gas outlet can be divided into a number of separated (e.g. by webs) mouths that are grouped in a ring shape.

Preferably, at least one partition wall 108 is provided which interrupts the ring-shaped carrier gas outlet viewed in the circumferential direction, as can be seen in FIG. 2.

A distributor chamber 106 is provided upstream of the carrier gas outlet, which distributes the carrier gas flow to be guided towards the workpiece's part to be cooled along the circumference of the workpiece to be cooled over the entire carrier gas outlet.

At the same time, the distributor chamber is preferably configured as a swirling chamber that intensifies the intermixing of the carrier gas and the cooling mist droplets.

The flow cross section, through which the carrier gas flowing from the distributor chamber 106 into the area of the carrier gas outlet has to flow, narrows from the distributor chamber towards the outlet cross section of the carrier gas outlet, which imparts a high flow speed to the carrier gas flow at the time of its first impact on the workpiece to be cooled.

It can be seen from the synopsis of FIGS. 2 to 4, that the distributor chamber 106 is configured as a circular ring-shaped chamber into which the carrier gas flow enters from the side via the inlet neck 102 and in whose center the pipe part 107 is disposed, which leads off the carrier gas flow away from the workpiece to be cooled, and which opens out into the outlet neck. The distributor chamber 106 surrounds the lead-off pipe part 107 in the manner of a jacket pipe. The distributor chamber 106 grasps around the lead-off pipe on the end face thereof. In the area of this grasp, the distributor chamber 106 is connected to the lead-off pipe part 107 via said carrier gas outlet 105, so that there is a flow connection between them. The component's section to be cooled protrudes into the lead-off pipe part through the opening at the end face thereof.

The free cross section of the section of the lead-off pipe part immediately following the carrier gas outlet expands, preferably conically. The angle at which this expansion takes place relative to the longitudinal axis of the lead-off pipe part is preferably >25 and <60 degrees, ideally about 45 degrees.

Due to the carrier gas feeding pipe section 109 disposed laterally, but substantially symmetrically to the center axis of the distributor chamber, two partial flows are formed in the distributor chamber (if the latter is in the position shown in FIG. 2), which move around the outside of the lead-off pipe part 107 and have a tendency to rise up and which exit with the required uniformity via the, most frequently, several (in this case a total of 6) mouths that form the carrier gas outlet 105, see FIG. 4 and FIG. 2.

The injector 111 is disposed upstream of the swirling chamber. It is preferably positioned on a web 112 that crosses through the carrier gas feeding pipe section 109.

It should be emphasized that protection is sought for all embodiments, in particular also for the following embodiments, in each case on their own:

Cooling device comprising a pump 2 in the form of a centrifugal fan and a cooler 8 which is either entirely or partially accommodated in the center of the rotor of the centrifugal fan.

Cooling device comprising a pump 2 having a jacket 10 which is configured as a collector for cooling agent condensed and/or thrown off in the pump and, preferably with a filter being interposed, is connected to a pump 11 that withdraws the collected cooling agent 24 and feeds it to the injector.

Cooling device configured as a desktop device with a tabletop (28), underneath which the pump (2) for generating the carrier gas flow (23), the cooler (8) and preferably also the cooling unit feeding refrigerant to the cooler are accommodated, and above which the cooling chamber (6), a feeding device (15) for automatically loading the cooling chamber (6), preferably in the form of a rotary table operating in accordance with the revolver principle, and the injector (7) for the cooling agent are disposed.

It should be emphasized that protection is sought for the first exemplary embodiment, in particular also for the following embodiment:

Cooling device whose injector (7) charges the carrier gas flow (23) with the coolant (24) in an area in which the carrier gas flow (23) is conducted substantially as a down flow in the vertical direction from the top towards the bottom.

It should be emphasized that protection is sought for the second exemplary embodiment, in particular also for the following embodiments on their own:

Cooling device whose injector 111 is disposed upstream of the distributor chamber, preferably in the carrier gas feeding pipe section 109.

Device 1 for cooling a shrinking assembly previously subjected to a heat application, in particular in the form of a shrink chuck 18 into which the shank of a tool was clamped or from which it was unclamped (cooling device), wherein the device comprises a pump 2 with which it generates a carrier gas flow 23, in particular an air flow, which is charged with a liquid cooling agent 24, in particular water, so that a coolant flow 23, 24 is generated which, volume-wise, predominantly consists of the carrier gas 23, and which then sweeps over at least the section to be cooled of the item.

Cooling device whose carrier gas channel comprises a lock part 100 with an insertion opening 104 configured in such a way that the part which is to be cooled of the workpiece to be cooled as intended with the cooling device can be pushed through the opening into the carrier gas channel and cooled there as intended, while a part of the workpiece that is not to be cooled directly preferably remains outside the carrier gas channel also during the cooling process.

For the sake of completeness, it should be noted that protection is sought also for every one of the claims on its own, with the exception of the features additionally resulting for it from its dependency, and in particular also for the idea of guiding the coolant in a closed loop in which it substantially nowhere becomes pressureless and/or circulates permanently with a speed imparted to it by a pump, instead of running pressureless in some areas or driven only by gravity.

The invention claimed is:

1. A cooling device for cooling a shrinking assembly previously subjected to a heat application comprising:
   a shrink chuck into which a shank of a tool is clamped or from which the shank of the tool was unclamped;
   a first substantially closed circuit, said first substantially closed circuit comprising a pump in the form of a fan, a carrier gas channel interconnecting a pressure side of the pump to a cross flow cooling chamber, and the cross flow cooling chamber connecting to a suction side of the pump for creating a carrier gas flow; and
   a second substantially closed circuit, said second substantially closed circuit comprising a liquid cooling agent path and said cross flow cooling chamber for circulation of a liquid cooling agent; said first substantially closed circuit and said second substantially closed circuit overlapping at said cross flow cooling chamber, wherein said carrier gas flow and said liquid cooling agent are combined to create a coolant flow mixture; wherein said coolant flow sweeps over at least a section of the shrink chuck to cool said shrink chuck, and wherein downstream of said cross flow cooling chamber, said coolant flow mixture separates to become said carrier gas flow within said first substantially closed circuit and said liquid cooling agent within said second substantially closed circuit.

2. The cooling device according to claim 1, wherein the cooling device has a cooler downstream from an item to be cooled, which extracts from the coolant flow at least a portion of heat that was absorbed by contact with the item to be cooled.

3. The cooling device according to claim 1, wherein the cooling device comprises an injector which is disposed upstream of the cooling chamber and which charges the carrier gas flow with the liquid cooling agent such that the liquid cooling agent has been dispersed in the carrier gas flow uniformly prior to the cooling agent and the carrier gas flow reaching the cooling chamber.

4. The cooling device according to claim 3, wherein—between the injector and the cooling chamber, where the first and second substantially closed circuits overlap—a first guiding device whirls the coolant flow comprising the carrier gas and the liquid cooling agent, imparting a turbulence to the coolant flow, before the coolant flow reaches the cooling chamber.

5. The cooling device according to claim 4, wherein a second guiding device is disposed upstream of the cooling chamber or of an item to be cooled, which shapes the coolant flow and focuses the coolant flow on the item to be cooled.

6. The cooling device according to claim 5, wherein the second guiding device is a nozzle whose outlet cross section is adjustable.

7. The cooling device according to claim 5, wherein a third guiding device, which reduces the size of a free flow cross section between the item to be cooled or a sleeve section and a wall of the cooling chamber, is disposed directly in an area in which the coolant flow impacts the item to be cooled for a first time, wherein the area is a free end of a tool holder's sleeve section to be cooled.

8. The cooling device according to claim 7, wherein the third guiding device is configured to be adjustable such that at least one of the group consisting of: the third guiding device can be moved in its entirety in and contrary to the main flow direction; the free flow cross section enclosed by the third guiding device can be reduced and increased; and the third guiding device's angle of incidence can be changed so that the third guiding device imparts a stronger or weaker turbulence to the coolant flow.

9. The cooling device according to claim 7, wherein the third guiding device is configured such that the coolant flow builds up a back pressure in front of the third guiding device and the pressure is relieved upon passing the third guiding device, and the coolant flow's tendency to absorb heat is increased.

10. The cooling device according to claim 1, wherein the cooling chamber is configured and aligned such that the cooling chamber is capable of accommodating the shrink chuck to be cooled such that the coolant flow impacts the shrink chuck for a first time in an area of a free end of a sleeve section of the shrink chuck and then flows off substantially in a direction towards an end of the shrink chuck that is intended for clamping into a machining tool, with the coolant flow being conducted through the cooling chamber as a down flow.

11. The cooling device according to claim 1, wherein the carrier gas channel comprises a lock part with an insertion opening configured in such a way that the shrink chuck can be pushed through the opening into the carrier gas channel and cooled there as intended; in the process, a part of a workpiece that is not to be cooled directly remains outside the carrier gas channel also during the cooling process; and the part of the workpiece that is not to be cooled directly at least substantially seals the insertion opening when the workpiece is inserted to the maximum extent.

12. The cooling device according to claim 11, wherein a carrier gas outlet, which grasps the cross flow cooling chamber in the manner of a full or at least ¾ ring, and from which a carrier gas flow exits that sweeps over the workpiece's part to be cooled, is provided on a side of the insertion opening that faces the inside of the carrier gas channel, following the insertion opening immediately or at a distance of less than 2 cm.

13. The cooling device according to claim 12, wherein a distributor chamber is provided upstream of the carrier gas outlet, which distributes the carrier gas flow to be guided towards the workpiece's part to be cooled along the circumference of the workpiece to be cooled over the entire carrier gas outlet, with the distributor chamber at the same time being configured as a swirling chamber that intensifies an intermixing of the carrier gas and the cooling mist droplets.

14. The cooling device according to claim 13, wherein a flow cross section, through which the carrier gas flowing from the distributor chamber into the area of the carrier gas outlet has to flow, narrows from the distributor chamber towards an outlet cross section of the carrier gas outlet.

15. The cooling device according to claim 13, wherein the distributor chamber is configured as a circular ring-shaped chamber into which the carrier gas flow enters from a side and in whose center a pipe part is disposed that leads off the carrier gas flow away from the workpiece to be cooled.

16. A method for cooling off an item previously subjected to a heat application, as a multi-part shrinking assembly, using the cooling device of claim 1, comprising:
generating the carrier gas flow which is charged with the liquid cooling agent so that, together with the cooling agent, the carrier gas flow forms the coolant flow that is directed onto the item to be cooled;
pumping the carrier gas co-forming the mist or the mixture around at a mean speed of >2 m/s in a closed circuit with a directed movement and at an overpressure provided at the pump outlet of <0.5 bar, into which the shrink chuck to be cooled is introduced entirely or partially.

17. The coolant flow mixture in the cooling device of claim 1, wherein the mixture is accelerated to a certain speed, moves in a substantially directed manner and consists of the carrier gas, in particular air, and the liquid cooling agent, in particular water, for cooling off again the shrink chuck, comprising:
pumping the carrier gas co-forming the mixture around at a mean speed of >2 m/s in a closed circuit with a directed movement and at an overpressure provided at a pump outlet of <0.5 bar, into which the shrink chuck to be cooled is introduced entirely or partially.

18. The cooling device according to claim 1, wherein the liquid cooling agent consists essentially of water.

\* \* \* \* \*